(12) United States Patent
Qiu et al.

(10) Patent No.: US 7,991,139 B2
(45) Date of Patent: Aug. 2, 2011

(54) METHODS AND APPARATUS TO LIMIT RING TREES IN VOICE OVER INTERNET PROTOCOL NETWORKS

(75) Inventors: Chaoxin Charles Qiu, Austin, TX (US); Robert Francis Dailey, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 621 days.

(21) Appl. No.: 11/352,796

(22) Filed: Feb. 13, 2006

(65) Prior Publication Data
US 2007/0201445 A1 Aug. 30, 2007

(51) Int. Cl.
*H04M 3/42* (2006.01)
(52) U.S. Cl. ......... 379/211.04; 379/205.01; 379/207.16; 379/211.03; 379/179; 379/252; 370/352; 370/356
(58) Field of Classification Search .......... 379/156, 379/207.16, 423, 211.04, 171, 194, 88.12, 379/88.19, 188, 202.01, 211, 212, 205.01, 379/211.03, 179, 252
See application file for complete search history.

(56) References Cited

U.S. PATENT DOCUMENTS

| | | | | |
|---|---|---|---|---|
| 4,493,949 A | * | 1/1985 | Retallack et al. | 370/362 |
| 5,586,169 A | * | 12/1996 | Pinard et al. | 379/82 |
| 5,768,356 A | | 6/1998 | McKendry et al. | |
| 5,802,160 A | * | 9/1998 | Kugell et al. | 379/211.04 |
| 5,930,338 A | * | 7/1999 | McKendry et al. | 379/88.25 |
| 6,009,159 A | | 12/1999 | Baiyor et al. | |
| 6,115,459 A | * | 9/2000 | Wakabayashi | 379/156 |
| 6,584,317 B2 | | 6/2003 | Mukerjee et al. | |
| 6,622,016 B1 | | 9/2003 | Sladek et al. | |
| 6,681,232 B1 | | 1/2004 | Sistanizadeh et al. | |
| 6,714,636 B1 | | 3/2004 | Baiyor et al. | |
| 6,845,152 B2 | | 1/2005 | Taff et al. | |
| 6,978,004 B1 | | 12/2005 | Levine | |
| 7,173,910 B2 | | 2/2007 | Goodman | |
| 2003/0204636 A1 | * | 10/2003 | Greenblat et al. | 709/251 |
| 2003/0212830 A1 | | 11/2003 | Greenblat et al. | |
| 2004/0170268 A1 | | 9/2004 | Hakusui | |
| 2005/0041642 A1 | | 2/2005 | Robinson | |
| 2005/0063529 A1 | | 3/2005 | Meldrum et al. | |
| 2005/0069097 A1 | * | 3/2005 | Hanson et al. | 379/88.12 |
| 2005/0238160 A1 | | 10/2005 | Sunstrum | |
| 2005/0243974 A1 | | 11/2005 | Pearson | |
| 2006/0227957 A1 | | 10/2006 | Dolan et al. | |
| 2007/0070982 A1 | * | 3/2007 | Croak et al. | 370/352 |
| 2007/0211702 A1 | | 9/2007 | Doradla et al. | |

OTHER PUBLICATIONS

International Search Report corresponding to International Application No. PCT/US20071005161, mailed Nov. 6, 2007, 3 pages.
Written Opinion corresponding to International Application No. PCT/US2007/005161, mailed Nov. 6, 2007, 4 pages.

(Continued)

*Primary Examiner* — Melur Ramakrishnaiah
*Assistant Examiner* — Yosef K Laekemariam
(74) *Attorney, Agent, or Firm* — Hanley, Flight & Zimmerman

(57) ABSTRACT

Methods and apparatus to limit ring trees in voice over Internet protocol (VoIP) networks are disclosed. A disclosed example parallel ring policy enforcer comprises a memory to hold parallel ring tree information and a policy checker to enforce a parallel ring policy based on a parallel ring request and the parallel ring tree information.

30 Claims, 10 Drawing Sheets

OTHER PUBLICATIONS

International Preliminary Report on Patentability, corresponding to International Application No. PCT/US2007/005161, mailed Sep. 9, 2008, 5 pages.

Tekelec, "IMS: An Architectural Overview from a Signaling Perspective," May 2005, 9 pages.

Official Action in U.S. Appl. No. 11/370,434 dated Apr. 27, 2010 (24 pages).

United States Patent and Trademark Office, "Office Action" issued in connection with U.S. Appl. No. 11/370,434, mailed Jan. 4, 2011, (24 pages).

United States Patent and Trademark Office, "Office Action" issued in connection with U.S. Appl. No. 11/370,434, mailed Aug. 18, 2010, (26 pages).

\* cited by examiner

METHODS AND APPARATUS TO LIMIT RING TREES IN VOICE OVER INTERNET PROTOCOL NETWORKS

FIELD OF THE DISCLOSURE

This disclosure relates generally to voice over Internet protocol (VoIP) networks and, more particularly, to methods and apparatus to limit ring trees in VoIP networks.

BACKGROUND

Parallel ringing is one of many advanced features offered by communication service providers such as, for example, providers of voice over Internet protocol (VoIP) and/or public switched telephone network (PSTN) based communication services. When parallel ringing is enabled for a telephone number, a call placed to the telephone number causes additional configured telephone numbers to ring at substantially the same time. In some example systems, parallel ring is offered as a user and/or consumer configurable service that can be configured by a user and/or consumer using, for example, a web portal. The user and/or consumer specifies and/or configures a telephone number with the additional telephone numbers to be rung when a call is placed to the telephone number.

As used herein, parallel ringing is meant to indicate that one phone call causes multiple devices of the same or different phone numbers to ring or otherwise give an indication of a call. The ringing may occur at substantially the same time depending upon network characteristics, etc. An example parallel ring service is commonly referred to in the industry as simultaneous ring. However, the term parallel ringing will be used herein as the additional telephone numbers that are rung may not actually ring simultaneously, even if a user perceives them to do so.

A parallel ring tree can be described by its depth. For example, a telephone call placed to a telephone number A0 can be configured to ring three children (e.g., B1, B2, B3) in parallel representing a parallel ring tree of depth 1. If one of the children (e.g., B2) is configured to ring two children (e.g., C1, C2), the parallel ring tree increases to a depth of 2. In general, the depth of a parallel ring tree is defined by the maximal level that a call to single telephone number can reach.

As more users and/or consumers subscribe and/or utilize parallel ringing, the potential for inadvertent and/or deliberate abuse of parallel ring increases. For example, a user may easily configure a parallel ring tree such that a single phone call placed to a telephone number causes hundreds of phones to ring thereby dramatically increasing the call processing and/or call handling requirements for the communication network. Currently, service providers rely on the user and/or consumer to employ reasonable parallel ring tree configurations and/or retain configuration rights for parallel ring services.

DETAILED DESCRIPTION

Methods and apparatus to limit ring trees in voice over Internet protocol (VoIP) networks are disclosed. A disclosed example parallel ring policy enforcer includes a memory to hold parallel ring tree information and a policy checker to enforce a parallel ring policy based on a parallel ring request and the parallel ring tree information. A disclosed example voice over Internet protocol (VoIP) apparatus includes a call handler to enforce a parallel ring policy to limit a number of devices rung in response to a call based on parallel ring control information contained in a VoIP call control message associated with the call. The example VoIP system may further include a A disclosed example method includes receiving a call control message having a header containing parallel ring control information, and determining a number of allowed parallel rings based on the parallel ring control information. A disclosed example communication link includes a signal propagation medium, and a call control message communicated via the signal propagation medium comprising a header specifying parallel ring control information. A disclosed example apparatus includes a memory to store a data structure having a first record to define a first ring tree for a first originating call and a second record to defined a second ring tree for a second originating call. The disclosed example apparatus further includes a processor to determine a number of allowed parallel rings for the first ring tree based on the first record. A disclosed example VoIP call control message comprises a header specifying parallel ring control information.

Figure 1:
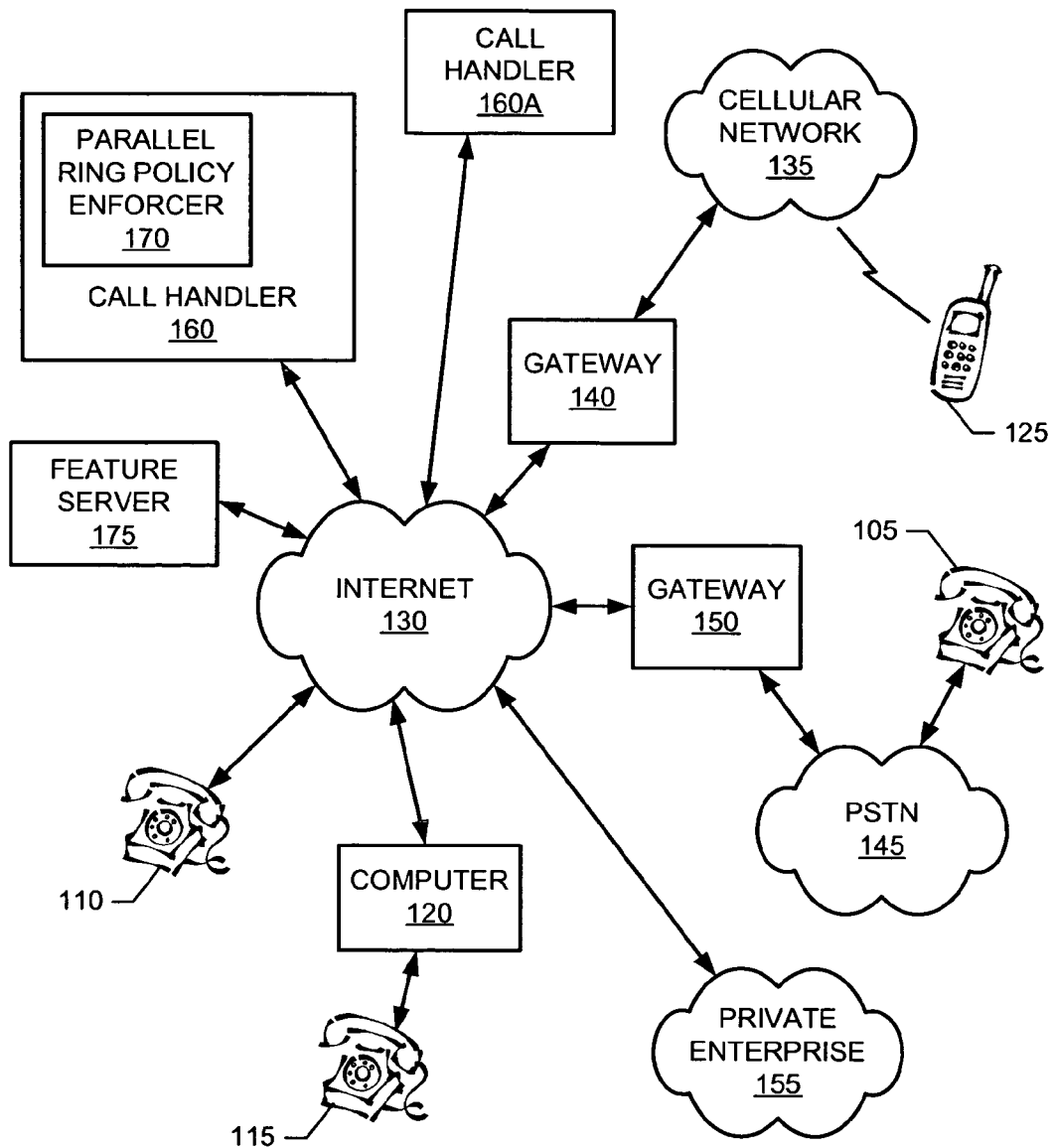
FIG. 1 is a schematic illustration of an example voice over Internet protocol (VoIP) network.

FIG. 1 is a schematic illustration of an example voice over Internet protocol (VoIP) communication system. In the illustrated example system of FIG. 1, communication sessions (e.g., telephone calls) may be placed from, to and/or between any variety of communication devices such as, for example, a wired or cordless PSTN-based telephone 105, a VoIP telephone and/or communication device 110, a telephone and/or communication device 115 communicatively coupled to for example, a personal computer 120, and/or a wireless (i.e., cellular) communication and/or telephony device 125. The example communication devices 105, 110, 115, 120 and/or 125 of FIG. 1 may be used to implement and/or provide any variety of communication services such as, for instance, voice and/or data telephony services, messaging services, voicemail services, Internet communication services, instant messaging, chat services, etc.

As illustrated in FIG. 1, the example communication devices 105, 110, 115, 120 and/or 125 may be communicatively coupled via any variety of communication devices, communication systems and/or communication networks. For example, the example VoIP telephone 110 may communicate with the example telephone 115 via an Internet-based network 130 (i.e., the Internet 130) and the computer 120; the example cellular phone 125 may communicate with the example VoIP telephone 110 via any variety of cellular communication network(s) 135, any variety of VoIP gateway(s) 140 and the Internet 130; the example telephone 105 may communicate with the example telephone 115 via any variety of PSTN 140, VoIP gateway(s) 150, the Internet 130 and the computer 120; etc. Additionally, as illustrated in FIG. 1, any variety of communication and/or telephone device associated with a private network and/or private enterprise 155 may also be connected to the example communication devices 105, 110, 115, 120 and/or 125 of FIG. 1 via any variety communication devices, communication systems and/or communication networks.

While the following disclosure refers to the example VoIP system and/or the example communication and/or telephony devices 105, 110, 115, 120 and/or 125 of FIG. 1, the example system of FIG. 1 may be used to provide services to, from and/or between any alternative and/or additional variety and/or number of communication devices (e.g., telephone devices, personal digital assistants (PDA), laptops, etc.). Additionally, although for purpose of explanation, the following disclosure refers to example systems, devices and/or networks 130, 135, 140, 145 and/or 150 illustrated in FIG. 1, any additional and/or alternative variety and/or number of communication systems, devices and/or network may be used to implement a communication system and/or provide communication services in accordance with the teachings disclosed herein.

Further, while for purpose of illustration, the follow disclosure references limiting parallel ring in VoIP communication systems and/or networks, persons of ordinary skill in the art will readily appreciate that the apparatus and methods disclosed herein may additional or alternatively be applied to any type of communication system and/or network such as, for example, the PSTN 145, the cellular network 135, etc. It will be further appreciated that, while for purpose of illustration, the following disclosure refers to telephone numbers and telephone calls, the following methods and apparatus may additionally or alternatively be used to establish other types of communication sessions such as, for example, messaging sessions, email sessions, etc.

Moreover, the term "ringing" is used herein to indicate that a telephone call is initiated to a called telephone number. The initiated telephone call may or may not physically result in a telephone being rung, but the intention of the call is to cause a telephone to alert a called party of the call by ringing and/or some other notification mechanism (e.g., vibration, lights, message, etc.).

In the example VoIP communication system of FIG. 1, the VoIP telephone 110, the computer 120 and/or the gateways 140, 150 utilize, among other things, VoIP protocols including the session initiation protocol (SIP) as specified in Internet Engineering Task Force (IETF) request for comment (RFC) documents 3161, 3262, 3263, 3264, 3265, 3266, etc. However, the example devices, systems and/or networks illustrated in FIG. 1 may implement and/or utilize any variety of additional and/or alternative communication protocols, methods and/or techniques to provide communication and/or telephone services such as, for example, the Institute of Electrical and Electronics Engineers (IEEE) H.323 standard.

To process and/or handle VoIP communication services between the example communication devices 105, 110, 115, 120 and/or 125, the example system of FIG. 1 includes any variety and/or number of call handlers. The example call handlers 160 and 160A of FIG. 1, among other things, receive, handle and/or process a call control message from a calling communication device (e.g., the VoIP telephone 110) to locate, route and/or otherwise assist in establishing a communication session (e.g., a telephone call) between the calling device and a called device associated with a called telephone number. Likewise, the example call handlers 160 and 160A receive, handle and/or process call control messages destined for a called communication devices from, for example, another call handler. In the example of FIG. 1, a call control message is a SIP INVITE message and the routing and/or establishing of the communication session is performed in accordance with SIP, but any call control message, protocol and/or standard could alternatively be used. In accordance with any variety of additional and/or alternative VoIP communication protocols, standards and/or implementations, the routing and/or establishing of a call session may be effected via one or more additional and/or alternative communication devices (e.g., the gateway 150) and/or systems (e.g., the PSTN 145).

In the illustrated example of FIG. 1, each VoIP communication device (e.g., the VoIP telephone 110, the computer-based VoIP device 120, etc.) is registered to, associated with and/or assigned to a call handler (e.g., the call handler 160) responsible for handling incoming and/or outgoing calls associated with the VoIP communication device. For instance, a VoIP communication device initiating an outgoing telephone call sends a SIP INVITE message to its associated call handler which, in turn, routes and/or assists in establishing a communication session (e.g., telephone call) with a called device. Likewise, a VoIP communication device receiving an incoming communication session receives a SIP INVITE message via its associated call handler.

In the example VoIP system of FIG. 1, the example call handler 160 is used to implement and/or provide parallel ring services to VoIP communication devices. In the illustrated example, a user enables and/or configures a parallel ring tree for their telephone number by configuring the example call handler 160 of FIG. 1 with additional telephone numbers. When the call handler 160 receives a SIP INVITE message for the user's telephone number, the call handler 160 initiates a telephone call to the user's telephone number and the additional telephone numbers at substantially the same time (i.e., in parallel). In particular, when the call handler 160 receives a SIP INVITE message, the example call handler 160 of FIG. 1 determines if the called telephone number has parallel ringing enabled and/or configured. If parallel ringing is enabled and/or configured, the example call handler 160 creates and sends a SIP INVITE message to the user's telephone number and each of the additional telephone numbers. In the illustrated example of FIG. 1, the additional SIP INVITE messages may be sent to a VoIP communication device (e.g., the computer 120) registered with the example call handler 160 and/or to a VoIP communication device via another call handler and/or a gateway (e.g., the gateway 140).

In the illustrated example of FIG. 1, the example call handler 160 implements and/or enforces a parallel ring policy and/or rules to limit the number of parallel ring calls being initiated within and/or being established by the example VoIP system of FIG. 1. For a call placed to telephone number having parallel ringing enabled and/or configured, to determine the number of additional telephone numbers that may be rung, the example call handler 160 of FIG. 1 may implement and/or include any variety of parallel ring policy enforcer 170 that implements the parallel ring policy and/or parallel ring rules. Example implementations of the example call handler 160 and/or the example parallel ring policy enforcer 170 are discussed below in connection with FIGS. 3 and/or 4. The example parallel ring policy enforcer 170 of FIG. 1 may be implemented as a process and/or thread executing on a processor associated with and/or implementing the call handler 160 by, for instance, executing all or a portion of the example machine readable instructions discussed below in connection with FIGS. 7A, 7B, 8A, 8B, 9A and/or 9B.

If the telephone number associated with a VoIP communication device (e.g., the computer 120) has parallel ringing enabled, then when the example call handler 160 receives a SIP INVITE destined for the computer 120, the example call handler 160 of FIG. 1 sends a parallel ring request to the parallel ring policy enforcer 170 via, for example, an application programming interface (API). In the example of FIG. 1, the example parallel ring policy enforcer 170 limits, based upon the parallel ring request and configurable parameters, the number and/or type of parallel ring calls that may be initiated by the example call handler 160. In particular, the example parallel ring policy enforcer 170 of FIG. 1 determines the number of parallel rings that may be performed by the call handler 160 and returns the allowed number of parallel rings to the call handler 160 via, for example, the API. The example call handler 160 of FIG. 1 then creates and sends no more than the allowed number of SIP INVITE messages. If the number of allowed parallel rings is less than the configured number of additional telephone numbers (i.e., requested number of parallel rings), the example call handler 160 of FIG. 1 rings the additional telephone numbers starting from the top of the list. However, the example call handler 160 may select the subset of the additional telephone numbers using any additional and/or alternative method. If the allowed number of parallel rings equals or exceeds the number of additional telephone numbers, all devices are rung.

As illustrated in FIG. 1, a standalone feature server (e.g., an example feature server 175) may used to implement the example parallel ring policy enforcer 170. Additionally, the call handler 160 may include and/or otherwise implement a feature server to implement the parallel ring policy enforcer 170. Moreover, the example parallel ring policy enforcer 170 and/or the example feature server 175 of FIG. 1 may be resources shared by multiple call handlers. For instance, an example call handler 160A of FIG. 1 does not include and/or otherwise implement a parallel ring policy enforcer 170 and, thus, utilizes a parallel ring policy enforcer associated with another call handler (e.g., call handler 160) and/or a standalone feature server (e.g., the feature server 175). If a call handler utilizes a feature server not implemented by and/or within the call handler (e.g., the example feature server 175), in the illustrated example of FIG. 1, the call handler and the feature server use a messaging interface to interact via, for example, the Internet 130.

The example parallel ring policy enforcer 170 may limit the number of parallel rings based upon any variety, combination and/or number of parallel ring policies and/or parallel ring rules. For example, the parallel ring policy enforcer 170 may limit the number of parallel rings by limiting the maximum depth of a parallel ring tree, by limiting the number of telephone numbers rung by a parallel ring tree (i.e., the size and/or number of nodes in the tree), by limiting the number of system-wide ongoing parallel ring calls. Other example policies and/or rules abound.

In most VoIP networks and/or systems, multiple and/or distributed call handlers may be utilized. Further, a parallel ring tree may start at any called party (i.e., VoIP communication device) registered (i.e., associated) with one call handler and can trigger a parallel ring call to a called party (i.e., a child) registered at another call handler. In the illustrated example of FIG. 1, parallel ring policies and/or rules are implemented and/or enforced at each individual call handler (or set of call handlers) served by a parallel ring policy enforcer instance (e.g., the parallel ring policy enforcer 170, the feature server 175, etc.). In particular, the number of allowed parallel rings, ring tree depth, etc. is limited at each parallel ring policy enforcer instance. As such, each call handler is protected against excessive parallel ring calls and, thus, the entire example VoIP network of FIG. 1 is protected.

Figure 2:
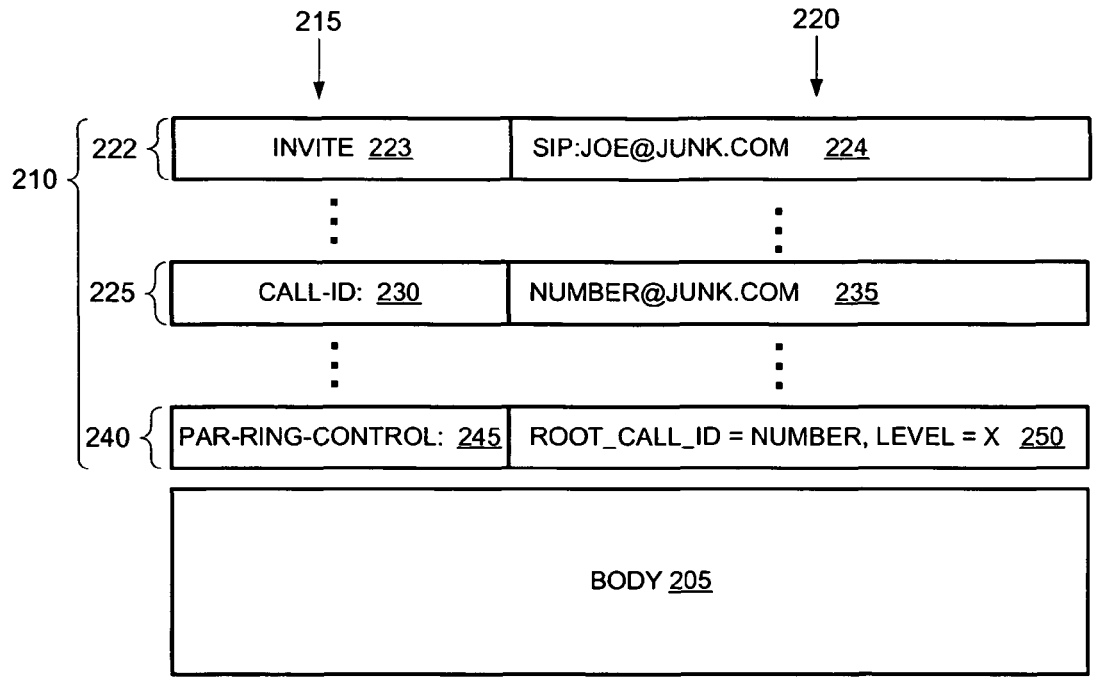
FIG. 2 illustrates an example call control message.

FIG. 2 illustrates an example SIP INVITE message, that is, a call control message. The example call control message of FIG. 2 includes a body 205 and one or more mandatory and/or optional headers 210 that each include a case-insensitive token 215 that identifies the header and a case-insensitive set of tokens 220 that contain the information conveyed by the header. The example SIP INVITE message of FIG. 2 includes a mandatory header 222 that identifies the example message as a SIP INVITE message that contains a INVITE token 223 and an associated value 234 that uniquely identifies to whom the INVITE message is being sent. The example SIP INVITE message also includes a mandatory call identification header 225 that contains a CALL-ID token 230 and an associated value 235 that uniquely identifies the call (i.e., the SIP INVITE message).

To convey parallel ring control information in the example VoIP network of FIG. 1, the example call control message of FIG. 2 includes a parallel ring control information header 240. The example parallel ring control information header 240 of FIG. 2 includes an identification token 245 (PAR-RING-CONTROL), and information token(s) 250 that identify the root of the parallel ring tree (e.g., the original called telephone number) (i.e., ROOT_CALL_ID 235) and the current depth of the parallel ring tree (i.e., LEVEL). As illustrated, the example SIP INVITE message of FIG. 2 may include any variety or number of additional mandatory and/or optional headers.

In the examples of FIGS. 1 and 2, the ROOT_CALL_ID 235 will have the value 235 of a call identification header 225 of the SIP INVITE message sent to the original called telephone number. A LEVEL of one (1) indicates that the SIP INVITE message was due to additional telephone numbers configured for the original called telephone number (i.e., child telephone numbers). If one of the child telephone number also has a parallel ring tree enabled, a parallel ring control information header 240 included in subsequent SIP INVITE messages would still identify the root of the parallel ring tree (i.e., the original ROOT_CALL_ID 235 of the original SIP INVITE message) but would increment the value of LEVEL to two (2) since the parallel ring tree now has a depth of two (2).

In the example system of FIG. 1, the parallel ring control information header 240 is used to convey parallel ring information and is used by a call handler and/or a parallel ring policy enforcer to determine a number of parallel ring calls that may be initiated. When the example call handler 160 determines that a called telephone number has an enabled parallel ring tree, the example call handler 160 of FIG. 1, after receiving authorization from a parallel ring policy enforcer, creates a SIP INVITE message for each configured child (i.e., additional) telephone number. The created SIP INVITE messages will either have a parallel ring control information header 240 added (if a parallel ring tree is being started), or will include an updated parallel ring control information header 240 to reflect the additional parallel ring calls being initiated.

In the example system of FIG. 1, a SIP INVITE message for a telephone call that is not triggered by a parallel ring parent may not contain the example parallel ring control information header 240.

Figure 3:
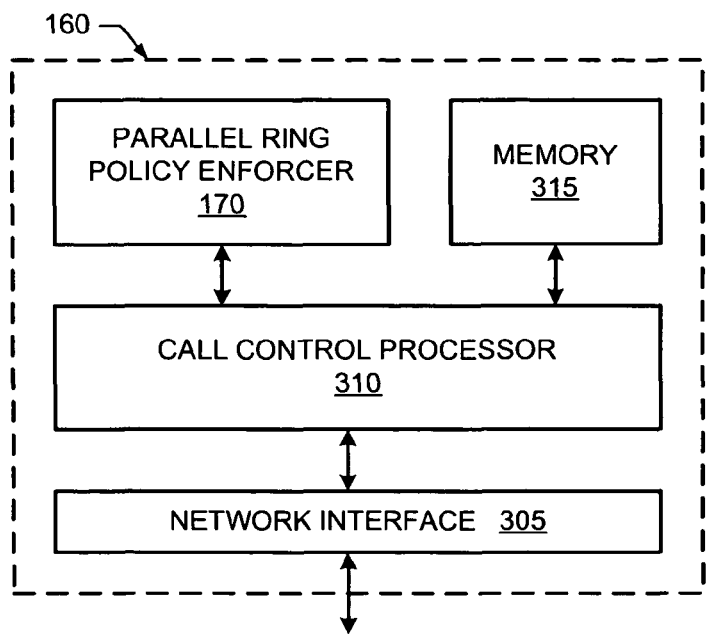
FIG. 3 illustrates an example manner of implementing the example call handler of FIG. 1.

FIG. 3 illustrates an example manner of implementing the example call handler 160 of FIG. 1. To interact with communication devices (e.g., the VoIP phone 110, the gateway 140, etc.), systems and/or networks (e.g., the PSTN 125, the private enterprise 155, etc.), the example call handler 160 of FIG. 3 includes any variety of network interface(s) 305. The example network interface 305 of FIG. 3 may be used to, among other things, send and/or receive call control messages (e.g., the example SIP INVITE message of FIG. 2) and/or parallel ring requests.

To process received call control messages, the example call handler 160 of FIG. 3 includes a call control processor 310. The example call control processor 310 of FIG. 3 may be any variety of processor such as, for example, a microprocessor, a microcontroller, an advanced reduced instruction set computing (RISC) machine (ARM) processor, etc. In general, the example call control processor 310 executes machine readable instructions (e.g., all or any portion of the example machine readable instructions illustrated in FIGS. 7A, 7B, 8A, 8B, 9A and/or 9B) stored in a memory (e.g., a memory 315) to implement and/or to provide one or more of a variety of user interfaces, applications, services (e.g., VoIP services), functionalities, communication protocols (e.g., SIP) implemented and/or provided by the example call handler 160.

To determine a number and/or type of parallel ring calls that may be initiated, the example call handler 160 of FIG. 3 includes a parallel ring policy enforcer 170 to implement parallel ring policies and/or parallel ring rules. In the illustrated example of FIG. 3, the example call control processor 310 and the example parallel ring policy enforcer 170 interact via any variety of API. Alternatively, as discussed above, a parallel ring policy enforcer (e.g., the example feature server 175) may be implemented separately from a call handler (e.g., the example call handler 160A of FIG. 1). In such examples, the example call control processor 310 of FIG. 3 and the example feature server 175 communicate using messages via, for example, the example network interface 305 and the Internet 130. An example manner of implementing the example parallel ring policy enforcer 170 and/or the example feature server 175 is discussed below in connection with FIG. 4.

To store machine readable instructions and/or any variety of information, configuration data and/or configurable parameters related to providing and/or implementing communication services and/or protocols, the example call handler 160 of FIG. 3 includes any variety of memory 315. The example memory 315 may include read only memory (ROM) and/or random access memory (RAM). RAM may be implemented by dynamic random access memory (DRAM), Synchronous DRAM (SDRAM), and/or any other type of RAM device, and ROM may be implemented by flash memory and/or any other desired type of memory device. Access to the example memory 315 is typically controlled by a memory controller (not shown) in a conventional manner. The information, configuration data and/or configurable parameters related to providing and/or implementing communication services and/or protocols may be stored in the memory 315 using any variety of tables, data structures, arrays, variables, etc.

Although an example call handler 160 has been illustrated in FIG. 3, call handlers may be implemented using any of a variety of other and/or additional devices, components, circuits, modules, etc. Further, the devices, components, circuits, modules, elements, etc. illustrated in FIG. 3 may be combined, re-arranged, eliminated and/or implemented in any of a variety of ways. For example, the call control processor 310 and the parallel ring policy enforcer 170 may be implemented using machine readable instructions executing on a single processor. Moreover, the example call handler 160 may be implemented by any variety of VoIP call processor.

Figure 4:
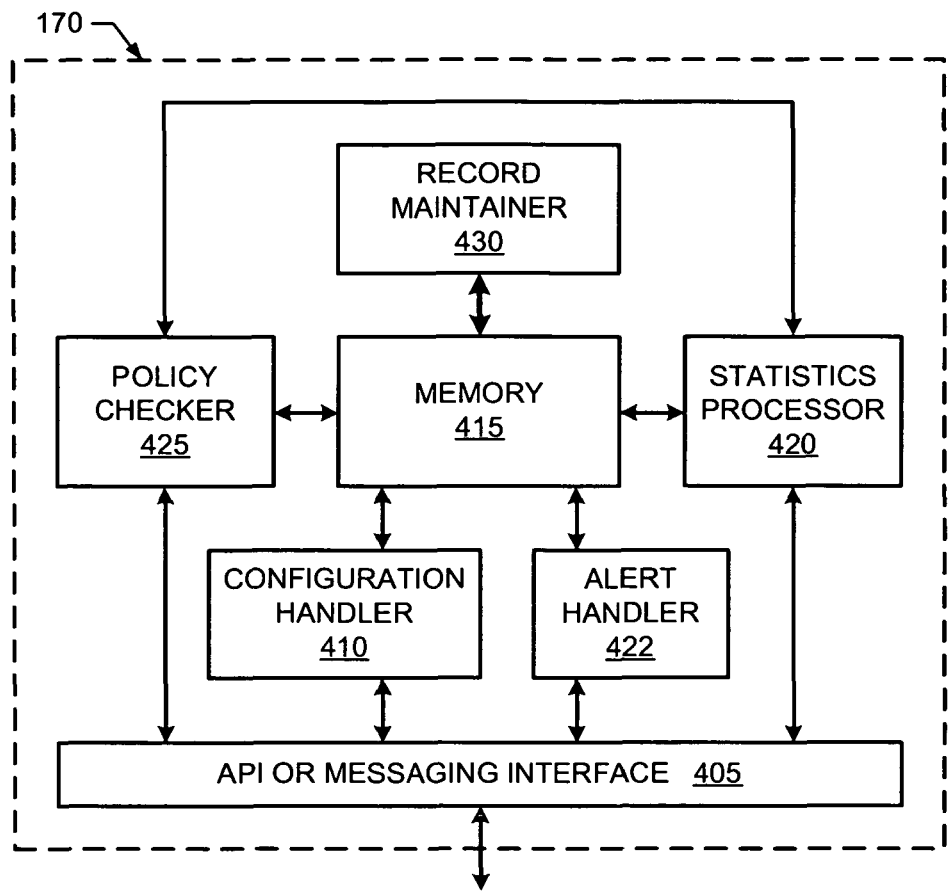
FIG. 4 illustrates an example manner of implementing the example parallel ring policy enforcer of FIGS. 1 and/or 3.

FIG. 4 illustrates an example manner of implementing the example parallel ring policy enforcer 170 of FIG. 1. Alternatively, as discussed above, the example parallel ring policy enforcer 170 of FIGS. 1 and/or 4 may be implemented by any variety of VoIP feature server. To receive parallel ring call requests and to indicate an allowed number and/or type of parallel ring calls that may be performed, the example parallel ring policy enforcer 170 of FIG. 4 includes any variety of API and/or messaging interface 405.

To process configuration requests and/or configuration information and/or data, the example parallel ring policy enforcer 170 of FIG. 4 includes a configuration handler 410. The example configuration handler 410 of FIG. 4 updates configuration data and/or parameters stored in a memory 415 based upon configuration requests and/or configuration information and/or data received by the example configuration handler 410 via the interface 405. In the examples of FIGS. 1 and/or 4, received configuration requests and/or configuration information and/or data include a maximum number of parallel ring children per parent (i.e., per tree node), a maximum parallel ring tree depth, a maximum parallel ring tree size, a maximum number of system-wide parallel ring calls, and/or a window duration.

To store variables, configuration parameters and/or statistics information, the example parallel ring policy enforcer 170 of FIG. 4 includes the memory 415. The memory 415 may be implemented using any type and/or number of memory devices such as, for example, any variety of RAM. The variables, configuration parameters and/or statistics information may be stored in the memory 415 using any variety and/or number of variables, data structures, arrays, tables, etc. Among other things, the memory 415 is used to store information regarding current (e.g., active) parallel ring trees (e.g., the example data structure 500 of FIG. 5). The memory 415 may also be used to store machine readable instructions executed by the configuration handler 410, a statistics processor 420 and/or a policy checker 425.

To generate and/or provide parallel ring tree operational and/or usage statistics, the example parallel ring policy enforcer 170 includes the statistics processor 420. The example statistics processor 420 of FIG. 4 can determine and/or compute any variety of statistics from the variables, configuration parameters and/or statistics information stored in the memory 415. For example, the example statistics processor 420 can compute the number of active parallel ring trees, the number of parallel ring calls that occurred in a time window, a maximal, minimal and/or average parallel ring calls in a time window, a number of oversized parallel ring trees, a number of over-deep parallel ring trees, a total number of rejected (e.g., not allowed) parallel ring tree calls, etc.

In the illustrated example of FIG. 4, the example interface 405 may also be used to monitor and/or acquire statistics determined, generated and/or computed by the example statistics processor 420. To monitor statistics and generate and/or send alarms based on monitored statistics, the example parallel ring policy enforcer 170 includes an alert handler 422. The example alert handler 422 of FIG. 4 generates and/or sends alarms if, for example, an unusually high level of parallel ring tree activity occurs. Such alarms may be sent using, for example, simple network management protocol (SNMP) alerts via the example interface 405. Further, the example alert handler 422 of FIG. 4 may be configured with alarm thresholds via, for example, configuration parameters stored in the memory 415 by the configuration handler 410 and/or directly via the interface 405.

To determine the number and/or type of parallel ring tree calls that may be performed, the example parallel ring policy enforcer 170 of FIG. 4 includes the policy checker 425. The example policy checker 425 of FIG. 4 receives parallel ring tree requests via the example interface 405, determines the number of allowed parallel ring tree calls, and then returns the determined number of allowed parallel ring calls via the example interface 405. In the illustrated example of FIG. 4, the example policy checker 425 is any variety of processor such as, for example, a microprocessor, a microcontroller, an ARM processor, etc. In general, the example policy checker 425 executes machine readable instructions (e.g., the machine readable instructions illustrated in FIGS. 9A and/or 9B) stored in a memory (e.g., the memory 415) to determine the number of allowed parallel ring tree calls based upon a received parallel ring request and the active parallel ring tree information (e.g., the example data structure 500 of FIG. 5) and/or configuration parameters stored in the memory 415 by the example configuration handler 410.

To maintain and/or otherwise update the records of the active parallel ring tree information stored in the memory 415, the example parallel ring policy enforcer 170 of FIG. 4 includes a record maintainer 430. The example record maintainer 430 of FIG. 4 periodically or aperiodically, determines if any records in the active parallel ring tree information are old and/or otherwise expired and then updates, deletes and/or otherwise removes them from the active parallel ring tree information. Example methods of implementing the record maintainer 430 are described below in connection with FIGS. 5 and/or 8A.

Although an example parallel ring policy enforcer 170 has been illustrated in FIG. 4, parallel ring policy enforcers may be implemented using any of a variety of other and/or additional devices, components, circuits, modules, etc. Further, the devices, components, circuits, modules, elements, etc. illustrated in FIG. 4 may be combined, re-arranged, eliminated and/or implemented in any of a variety of ways. For example, the configuration handler 410, the statistics processor 420, the alert handler 422, the policy checker 425 and/or the record maintainer 430 may be implemented using machine readable instructions executing on a single processor. In an example, the configuration handler 410, the statistics processor 420, the alert handler 422, the policy checker 425 and the record maintainer 430 are implemented as separate processing threads executing on a single processor.

Figure 5:
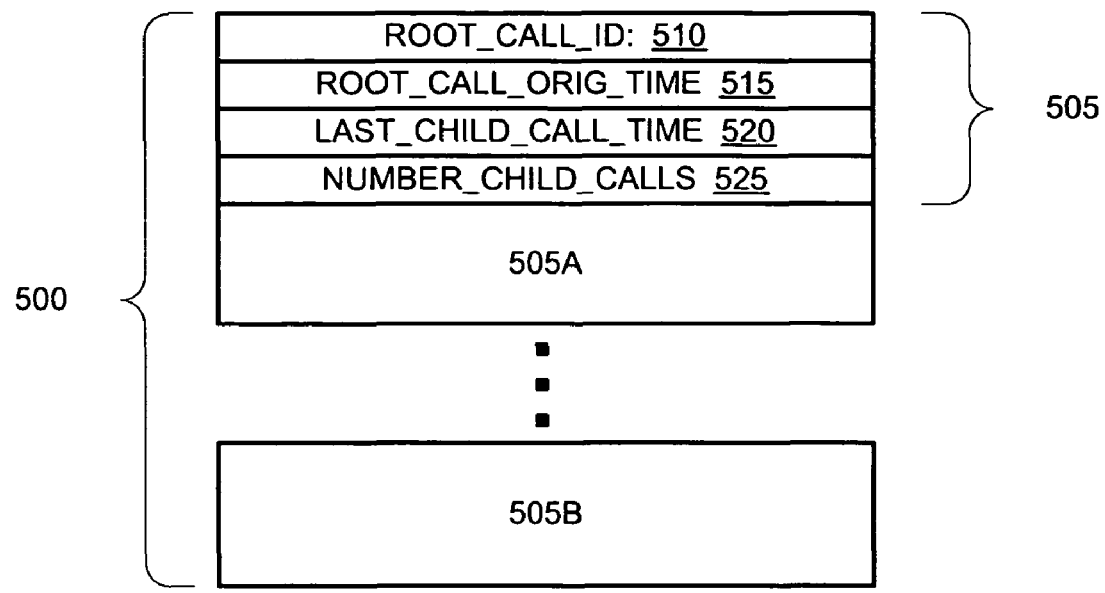
FIG. 5 illustrates an example data structure to represent active parallel ring trees.

FIG. 5 illustrates an example data structure 500 to store information regarding active parallel ring trees. As described above in connection in FIG. 4 and below in connection with FIGS. 7A-9B, the example data structure 500 of FIG. 5 is used by the example parallel ring policy enforcer 170, the example policy checker 425 and/or the example record maintainer 430. The example data structure 500 of FIG. 5 includes a record 505 for each active parallel ring tree. As illustrated, the example records 505 of FIG. 5 each contain a ROOT_CALL_ID 510 that identifies the ring tree, a time (i.e., ROOT_CALL_ORIG_TIME 515) at which the original telephone call occurred, a time (i.e., LAST_CHILD_CALL_TIME 520) at which the most recent ring tree call occurred, and a number of ring tree calls made for the parallel ring tree (i.e., NUMBER_CHILD_CALLS 525). In the examples of FIGS. 1 and 5, the ROOT_CALL_ID is equal to the CALL-ID value 235 (FIG. 2) of the SIP INVITE message sent to the original called telephone number.

In the examples of FIGS. 1, 4 and/or 5, when a new parallel ring tree is initiated (i.e., a telephone call is placed to a telephone number having an enabled and/or configured parallel ring tree), an additional record (e.g., 505, 505A, 505B, etc.) is added to the example data structure 500 of FIG. 5. Each additional record (505A, 505B, etc.) includes the same fields as the first record 505, but those fields are populated with the data corresponding to the associated parallel ring tree.

When a difference between the current time and the value of a LAST_CHILD_CALL_TIME 520 for any record (e.g., record 505, 505A, 505B, etc.) exceeds a threshold, the corresponding record is removed from the example data structure 500 by the example record maintainer 430 of FIG. 4. In the examples of FIGS. 1, 4 and/or 5, a value of twice the window duration is used as the threshold.

Figure 6:
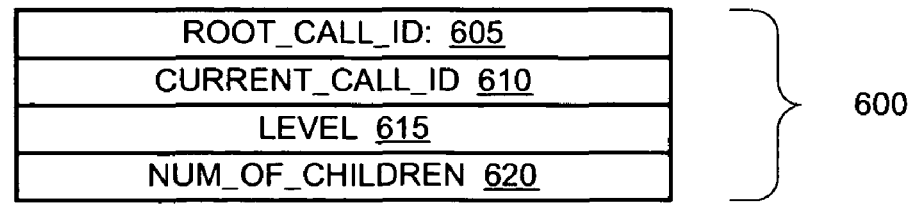
FIG. 6 illustrates an example parallel ring request.

FIG. 6 illustrates an example parallel ring request 600 received by the example parallel ring policy enforcer 170 and/or 175 of FIGS. 1, 3 and/or 4. The example request 600 of FIG. 6 includes a ROOT_CALL_ID field 605 that identifies the SIP INVITE message sent to the original called telephone number, a CURRENT_CALL_ID field 610 that identifies the current SIP INVITE message to a child telephone number, a LEVEL field 615 that indicates the current depth of the parallel ring tree, and a NUM_OF_CHILDREN field 620 which indicates the number of children that a call handler is requesting to ring in parallel.

FIGS. 7A, 7B, 8A, 8B, 9A and 9B illustrate flowcharts representative of example machine readable instructions that may be executed to implement the example call handler 160, the example call control processor 310, the example parallel ring policy enforcers 170 and/or 175, the example policy checker 425, the example record maintainer 430 and/or, more generally, the example VoIP system of FIG. 1. The example machine readable instructions of FIGS. 7A-9B may be executed by a processor, a controller and/or any other suitable processing device. For example, the example machine readable instructions of FIGS. 7A-9B may be embodied in coded instructions stored on a tangible medium such as a flash memory, or random access memory (RAM) associated with a processor (e.g., the processor 8010 shown in the example processor platform 8000 and discussed below in conjunction with FIG. 10). Alternatively, some or all of the example flowcharts of FIGS. 7A-9B may be implemented using an application specific integrated circuit (ASIC), a programmable logic device (PLD), a field programmable logic device (FPLD), discrete logic, hardware, firmware, etc. Also, some or all of the example flowcharts of FIGS. 7A-9B may be implemented manually or as combinations of any of the foregoing techniques, for example, a combination of firmware, software and/or hardware. Further, although the example machine readable instructions of FIGS. 7A-9B are described with reference to the flowcharts of FIGS. 7A-9B, persons of ordinary skill in the art will readily appreciate that many other methods of implementing the example call handler 160, the example call control processor 310, the example parallel ring policy enforcer 170 and/or 175, the example policy checker 425, the example record maintainer 430 and/or, more generally, the example VoIP system of FIG. 1 may be employed.

For example, the order of execution of the blocks may be changed, and/or some of the blocks described may be changed, eliminated, sub-divided and/or combined. Additionally, persons of ordinary skill in the art will appreciate that the example machine readable instructions of FIGS. 7A-9B be carried out sequentially and/or carried out in parallel by, for example, separate processing threads, processors, devices, circuits, etc.

Figure 7A:
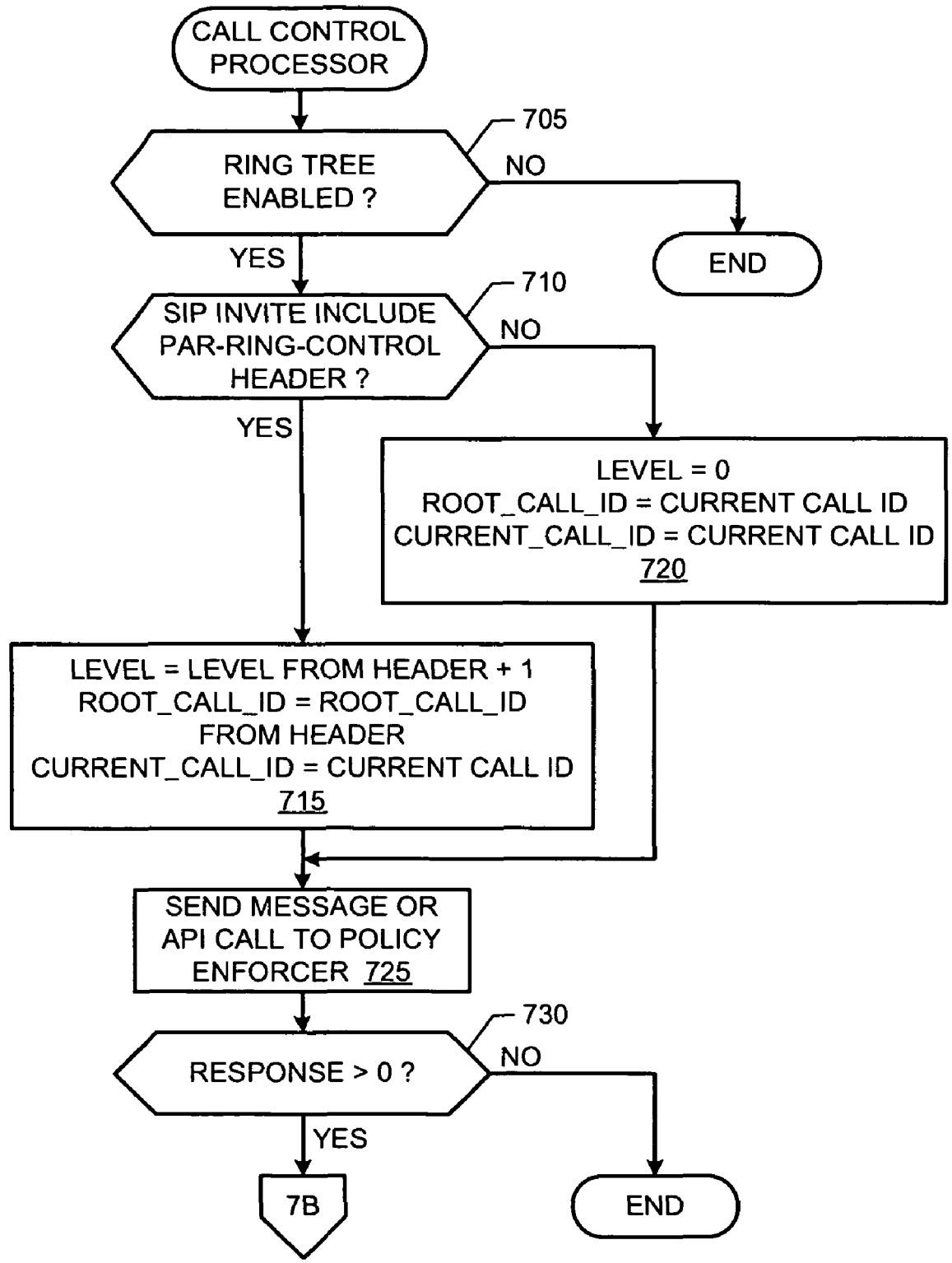
FIGS. 7A and 7B are flowcharts representative of example machine readable instructions which may be executed to implement the example call handler of FIGS. 1 and/or 3.
Figure 7B:
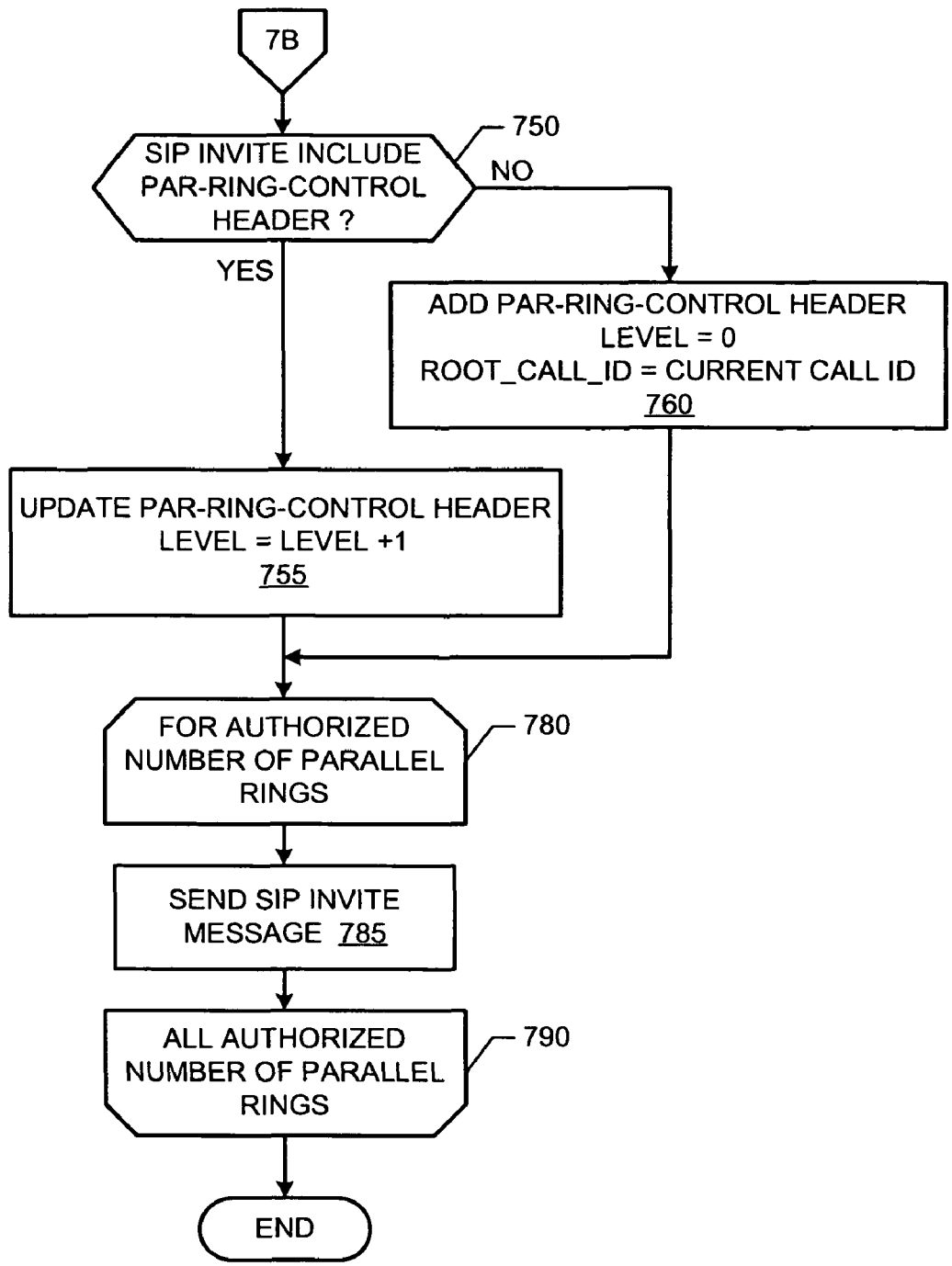

The example machine readable instructions of FIGS. 7A and 7B begin when the call control processor 310 and/or, more generally, the call handler 160 receives a call control message (e.g., the example SIP INVITE message of FIG. 2). The call control processor 310 determines if the called party of the SIP INVITE message has a parallel ring tree enabled and/or configured (block 705). If the called party does not have an enabled and/or configured parallel ring tree (block 705), the call control processor 310 exits the example machine readable instructions of FIGS. 7A and 7B without modifying and/or deleting any PAR-RING-CONTROL header 240 present in the SIP INVITE message.

If the called party has an enabled and/or configured parallel ring tree (block 705), the call control processor 310 determines if the SIP INVITE message contains a PAR-RING-CONTROL header 240 (block 710). If the SIP INVITE message contains a PAR-RING-CONTROL header 240 (i.e., this is a continuation of an ongoing and/or active parallel ring tree) (block 710), the call control processor 310 creates a parallel ring request (e.g., the example request 600 of FIG. 6) (block 715). In the request the value of the LEVEL field 615 will be the value of LEVEL from the header 240 plus one, the value of the ROOT_CALL_ID field 605 will be ROOT_CALL_ID from the header 240 and the value of the CURRENT_CALL_ID field 610 will be the call identifier 235 from the received SIP INVITE message.

If the SIP INVITE message does not contains a PAR-RING-CONTROL header 240 (i.e., this is the start of a parallel ring tree) (block 710), the call control processor creates a parallel ring request (e.g., the example request 600 of FIG. 6) (block 720). In the request, the value of the LEVEL field 615 will be zero (0), and the value of the ROOT_CALL_ID field 605 and the value of the CURRENT_CALL_ID field 610 will both be the call identifier 235 from the SIP INVITE message.

After the parallel ring request message 600 is created (block 715 or block 720), the call control processor 310 sends the request 600 to a parallel ring policy enforcer via either an API call (e.g., if the parallel ring policy enforcer is implemented by and/or within the call handler 160) or via a message (e.g., if the parallel ring policy enforcer is implemented by a feature server) (block 725). If the response value returned from the parallel ring policy enforcer is less than or equal to zero (block 730), the call control processor 310 is not allowed to initiate any parallel ring calls. The call control processor 310 then exits the example machine readable instructions of FIGS. 7A and 7B. If the response is greater than zero (block 730), control continues to block 750 of FIG. 7B.

Assuming for purposes of discussion that control has advanced to block 750, the call control processor 310 determines if the SIP INVITE message contains a PAR-RING-CONTROL header 240. If the SIP INVITE message contains a PAR-RING-CONTROL header 240 (i.e., this is a continuation of an ongoing and/or active parallel ring tree) (block 750), the call control processor 310 updates the PAR-RING-CONTROL header 240 in the SIP INVITE message by incrementing the value of the LEVEL field (block 755). If the SIP INVITE message does not contains a PAR-RING-CONTROL header 240 (i.e., this is a new parallel ring tree being started) (block 750), the call control processor 310 adds a PAR-RING-CONTROL header 240 to the SIP INVITE message (block 760). In the added PAR-RING-CONTROL header 240 the value of the LEVEL field is zero (0) and the value of the ROOT_CALL_ID field is the call identifier 235 from the received SIP INVITE message.

For the number of authorized (i.e., allowed) parallel ring calls (block 780), the call control processor 310 then sends the updated SIP INVITE message to one of the child telephone numbers (block 785). When all allowed parallel ring calls have been initiated (block 790), the call control processor 310 exits the example machine readable instructions of FIGS. 7A and 7B. If not all allowed parallel ring calls have been initiated (block 790), control returns to block 780 to send the next SIP INVITE message to the next child telephone number.

Figure 8A:
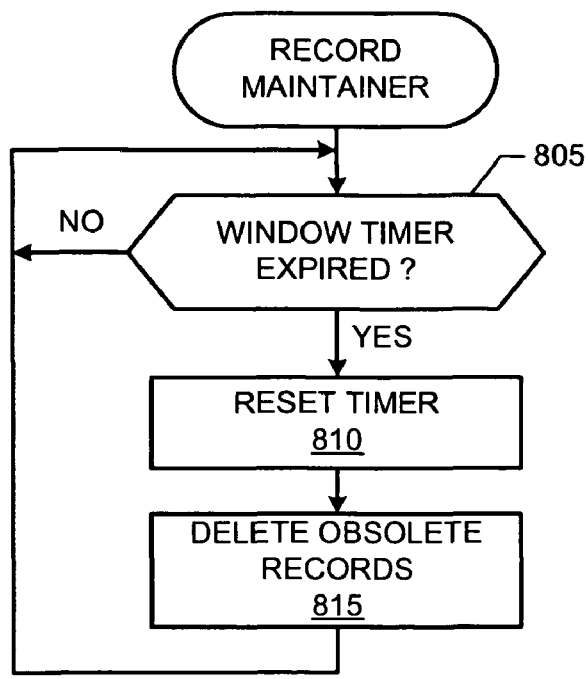
FIGS. 8A and 8B are flowcharts representative of example machine readable instructions which may be executed to implement the example parallel ring policy enforcers of FIGS. 1, 3 and/or 4 and/or the example record maintainer of FIG. 4.

The example machine readable instructions of FIG. 8A begin with the record maintainer 430 determining if a window timer has expired (block 805). If the window timer has not expired (block 805), control proceeds to block 840. If the window timer has expired, the parallel ring policy enforcer 170 resets the window timer (block 810). The record maintainer 430 then determines if any active parallel ring tree information (e.g., a record 505 of the example data structure 500 of FIG. 5) has expired (block 815). In the example machine readable instructions of FIG. 8, if a difference between the current time and the value of the value of the LAST_CHILD_CALL_TIME field 520 in any record 505 exeeds twice the window duration, the corresponding record 505 is removed from the active parallel ring tree information 505. Control then returns to block 805 to wait for the window timer to expire.

Figure 8B:
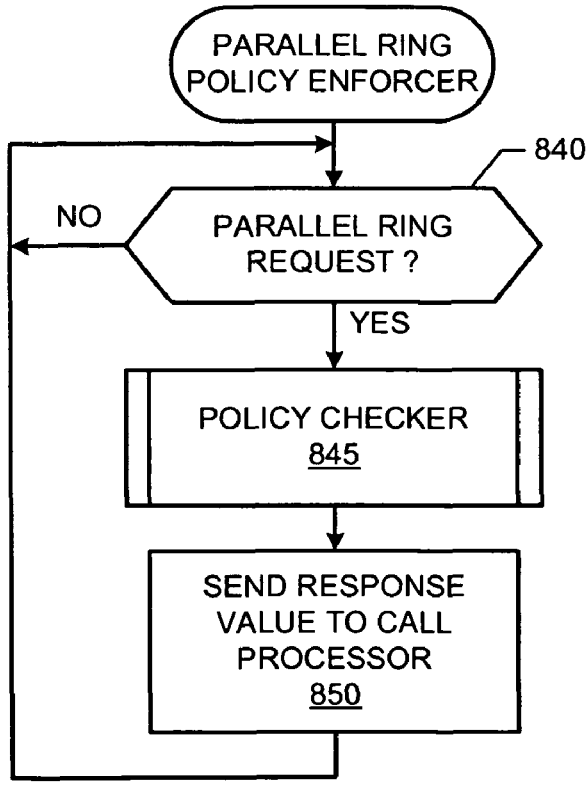

The example machine readable instructions of FIG. 8B begin with the parallel ring policy enforcer 170 determining if a parallel ring request (e.g., the request 600 of FIG. 6) was received from a call handler (block 840). If a parallel ring request 600 was not received (block 840), control returns to block 840 to wait for another parallel ring request. If a parallel ring request 600 was received (block 840), the policy checker 425 determines the number of allowed parallel ring calls by, for example, executing the example machine readable instructions of FIGS. 9A and 9B (block 845). The response value returned from the policy checker 425 (i.e., the number of allowed parallel ring calls) (block 845) is then sent to the call handler (block 850). Control then returns to block 840 to wait for another parallel ring request.

Figure 9A:
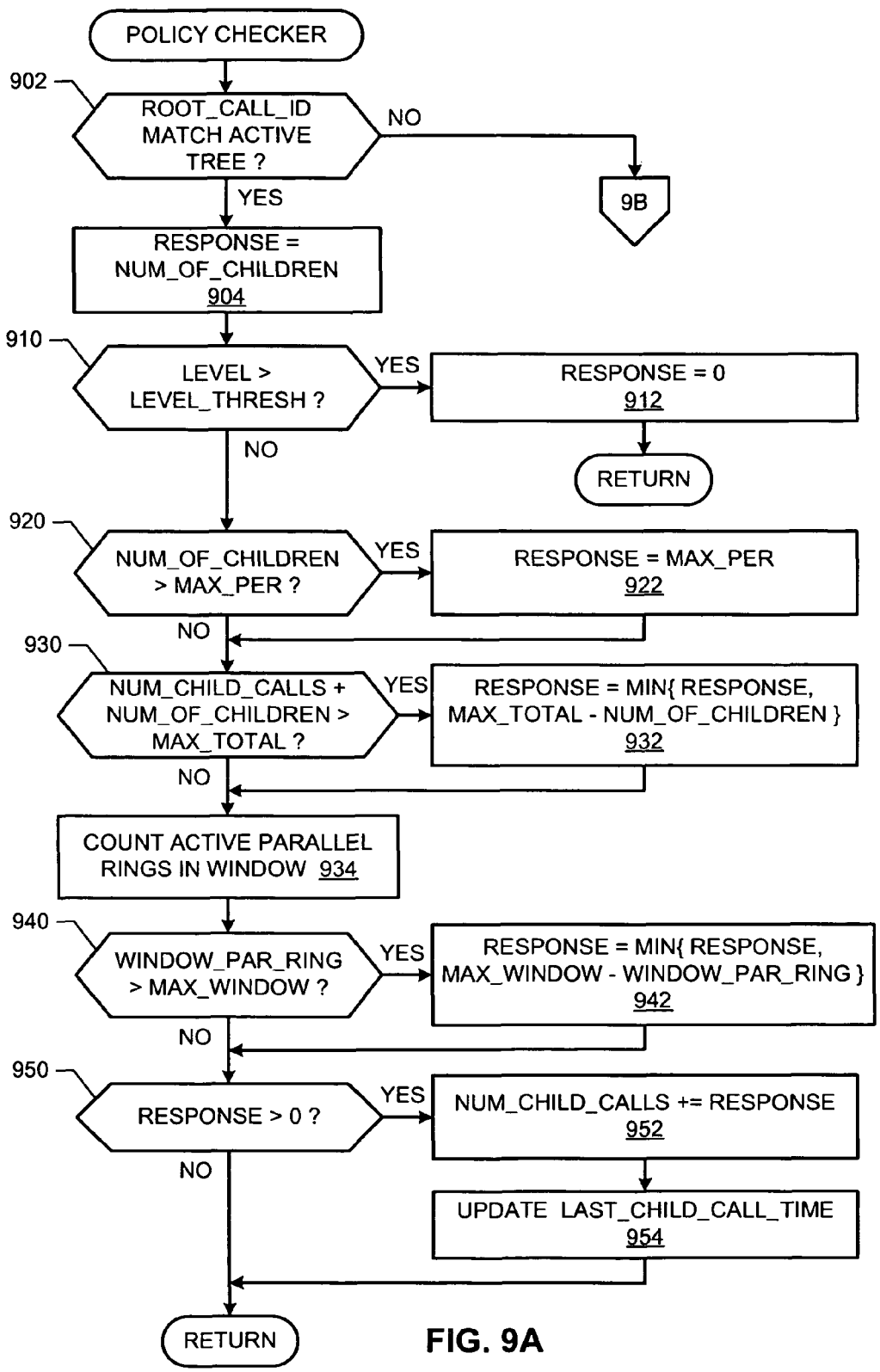
FIGS. 9A and 9B are flowcharts representative of example machine readable instructions which may be executed to implement the example policy checker of FIG. 4.
Figure 9B:
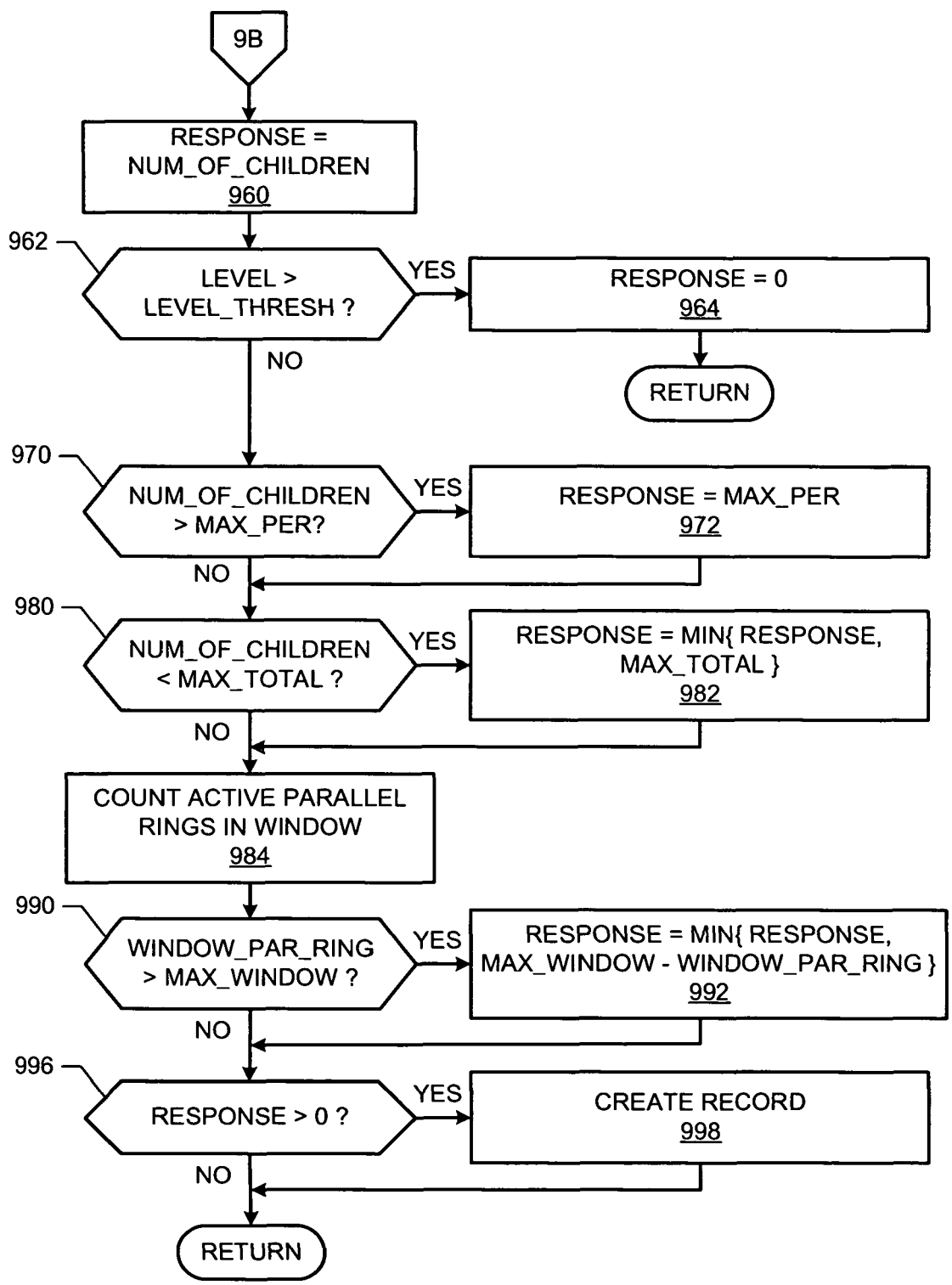

The example machine readable instructions of FIGS. 9A and 9B begin with the policy checker 425 determining if the value of the ROOT_CALL_ID field 605 contained in a parallel ring request 600 is listed in any active parallel ring tree information 500 record (block 902). If the value of the ROOT_CALL_ID field 605 contained in the parallel ring request 600 is not listed in any active parallel ring tree information 500 record (e.g., 505, 505A, 505B, etc.) (i.e., this is a start of a parallel ring tree) (block 902), control proceeds to block 960 of FIG. 9B.

If the value of the ROOT_CALL_ID field 605 contained in the parallel ring request 600 is listed in any active parallel ring tree information 500 record (e.g., 505, 505A, 505B, etc.) (i.e., this is an additional branch and/or node for an active parallel ring tree) (block 902), the policy checker 425 initializes an initial response value equal to the number of parallel ring calls requested in the received request 600 (i.e., the value of the NUM_OF_CHILDREN field 620) (block 906).

The policy checker 425 compares the value of the requested parallel ring tree depth (i.e., the value of the LEVEL field 615) from the received request 600 with a maximum parallel ring depth threshold value of LEVEL_

THRESH (block 910). If the value of the LEVEL field 615 exceeds the value of LEVEL_THRESH parameter (block 910), the response value is set equal to zero (0) (block 912). Control then returns from the example machine readable instructions of FIGS. 9A and 9B to the example machine readable instructions of FIG. 8B thereby returning the response value of zero (0).

If the value of the LEVEL field 615 does not exceed the value of the LEVEL_THRESH parameter (block 910), the policy checker 425 determines if the value of the value of the NUM_OF_CHILDREN field 620 exceeds a maximum number of children per parent threshold value of MAX_PER (block 920). If the value of the NUM_OF_CHILDREN field 620 does not exceed the value of the MAX_PER parameter (block 920), control proceeds to block 930. If the value of the NUM_OF_CHILDREN field 620 exceeds the value of the MAX_PER parameter (block 920), the policy checker 425 reduces the response value to the value of the MAX_PER parameter (block 922).

If a sum of the current size of the parallel ring tree (i.e., the value of the NUM_CHILD_CALLS field 525) and the value of the NUM_OF_CHILDREN field 620 does not exceed a maximum parallel ring tree size threshold of MAX_TOTAL (block 930), control proceeds to block 934. If the sum exceeds the value of the MAX_TOTAL parameter (block 930), the policy checker 425 sets the response value to a minimum of the current response value or the value of the value of the MAX_TOTAL parameter minus the value of the NUM_OF_CHILDREN field 620 (block 932).

The policy checker 425 then counts the number of active parallel ring calls in the current time window (i.e., a WINDOW_PAR_RING variable) (block 934). In the example of FIG. 9A, the policy checker 425 locates all of the records 505 of the example data structure 500 having a value of the LAST_CHILD_CALL_TIME field 520 that falls within WINDOW_DURATION seconds of the current time. For the located records 505, the policy checker 425 totals the NUMBER_CHILD_CALL field values 525. Alternatively, the policy checker 425 and/or the record maintainer 430 may maintain the WINDOW_PAR_RING variable such that at block 934 the policy checker 425 may simply read the WINDOW_PAR_RING variable from, for example, the memory 415. In particular, whenever the policy check 425 allows a number of parallel rings, the policy checker 425 may increment WINDOW_PAR_RING by the allowed number. Likewise, the record maintainer 430 may decrement WINDOW_PAR_RING whenever a record is removed from the active parallel ring tree information.

If the value of the WINDOW_PAR_RING variable is less than or equal to a maximum number of parallel ring calls threshold of MAX_WINDOW (block 940), control proceeds to block 950. If the value of the WINDOW_PAR_RING variable is greater than the value of the MAX_WINDOW parameter (block 940), the policy checker 425 sets the response value to a minimum of the current response value or the value of the value of the MAX_WINDOW parameter minus the value of the WINDOW_PAR_RING variable (block 942).

If the response value is less than or equal to zero (block 950), control returns from the example machine readable instructions of FIGS. 9A and 9B to the example machine readable instructions of FIG. 8B thereby returning the response value. If the response value is greater than zero (block 950), the policy checker 425 updates the record 505 for the parallel ring tree by updating the value of the NUMBER_CHILD_CALLS field 525 to reflect the additional allowed parallel ring calls (i.e., the response value) (block 952) and updating the value of the LAST_CHILD_CALL_TIME field 520 in the parallel ring tree information 500 with the current time (block 954). Control then returns from the example machine readable instructions of FIGS. 9A and 9B to the example machine readable instructions of FIG. 8B thereby returning the response value.

Turning to FIG. 9B, for a request to initiate a new parallel ring tree, the policy checker 425 initializes a response value equal to the number of requested parallel rings from the received request 600 (i.e., the value of the NUM_OF_CHILDREN field 620) (block 960). The policy checker 425 then compares the value of the requested parallel ring tree depth (i.e., the value of the LEVEL field 615) from the received request 600 with the maximum parallel ring depth threshold value of LEVEL_THRESH (block 962). If the value of the LEVEL field 615 exceeds the value of the LEVEL_THRESH parameter (block 962), the response value is set equal to zero (0) (block 964). Control then returns from the example machine readable instructions of FIGS. 9A and 9B to the example machine readable instructions of FIG. 8B thereby returning the response value of zero (0).

If the value of the LEVEL field 615 does not exceed the value of the LEVEL_THRESH parameter (block 962), the policy checker 425 determines if the value of the NUM_OF_CHILDREN field 620 exceeds the maximum number of children per parent threshold value of MAX_PER (block 970). If the value of the NUM_OF_CHILDREN field 620 does not exceed the value of the MAX_PER parameter (block 970), control proceeds to block 980. If the value of the NUM_OF_CHILDREN field 620 exceeds the value of the MAX_PER parameter (block 970), the policy checker 425 reduces the response value to the value of the MAX_PER parameter (block 972).

If the value of the NUM_OF_CHILDREN field 620 does not exceed the maximum parallel ring tree size threshold of MAX_TOTAL (block 980), control proceeds to block 984. If the value of the NUM_OF_CHILDREN field 620 exceeds the value of the MAX_TOTAL parameter (block 980), the policy checker 425 sets the response value to a minimum of the current response value or the value of the MAX_TOTAL parameter (block 982).

The policy checker 425 then counts the number of active parallel ring calls in the current time window (i.e., WINDOW_PAR_RING) (block 984). In the example of FIG. 9B, the policy checker 425 locates all the records 505 in the example data structure 500 having the value of the LAST_CHILD_CALL_TIME field 520 that falls within window duration seconds of the current time. For the located records 505, the policy checker 425 totals the NUMBER_CHILD_CALL field values 525.

If the value of the WINDOW_PAR_RING variable is less than or equal to the maximum number of parallel ring calls threshold of MAX_WINDOW (block 990), control proceeds to block 996. If the value of the WINDOW_PAR_RING variable is greater than the value of the MAX_WINDOW parameter (block 990), the policy checker 425 sets the response value to a minimum of the current response value or the value of the value of the MAX_WINDOW parameter minus the value of the WINDOW_PAR_RING variable (block 992).

If the response value is less than or equal to zero (block 996), control returns from the example machine readable instructions of FIGS. 9A and 9B to the example machine readable instructions of FIG. 8B thereby returning the response value. If the response value is greater than zero (block 996), the policy checker 425 creates and adds a new record 505 to the active parallel ring tree information 500

(block 998). Control then returns from the example machine readable instructions of FIGS. 9A and 9B to the example machine readable instructions of FIG. 8B thereby returning the response value.

Figure 10:
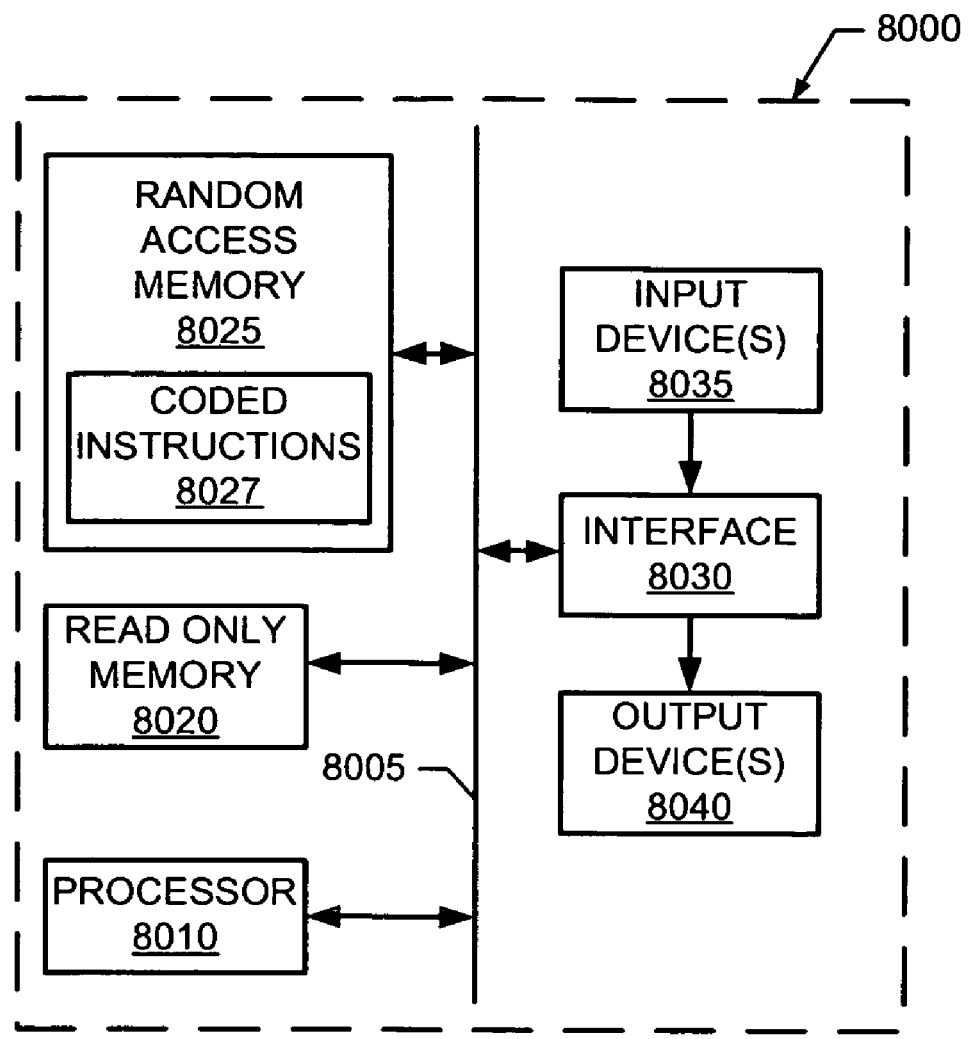
FIG. 10 is a schematic illustration of an example processor platform that may be used and/or programmed to execute the example machine readable instructions represented by FIGS. 7A, 7B, 8A, 8B, 9A and/or 9B to implement the example call handler, the example parallel ring policy enforcer, the example policy checker and/or the example record maintainer.

FIG. 10 is a schematic diagram of an example processor platform 8000 that may be used and/or programmed to implement the example call handler 160, the example call control processor 310, the example parallel ring policy enforcers 170 and/or 175, the example policy checker 425 and/or the example record maintainer 430. For example, the processor platform 8000 can be implemented by one or more general purpose microprocessors, microcontrollers, etc.

The processor platform 8000 of the example of FIG. 10 includes a general purpose programmable processor 8010. The processor 8010 executes coded instructions 8027 present in main memory of the processor 8010 (e.g., within a RAM 8025). The processor 8010 may be any type of processing unit, such as a microprocessor from the Intel®, AMD®, IBM®, or SUN® families of microprocessors. The processor 8010 may implement, among other things, the example machine readable instructions of FIGS. 7A-9B to implement the example call handler 160, the example call control processor 310, the example parallel ring policy enforcers 170 and/or 175, the example policy checker 425 and/or the example record maintainer 430.

The processor 8010 is in communication with the main memory (including a ROM 8020 and the RAM 8025) via a bus 8005. The RAM 8025 may be implemented by DRAM, SDRAM, and/or any other type of RAM device, and ROM may be implemented by flash memory and/or any other desired type of memory device. Access to the memory 8020 and 8025 is typically controlled by a memory controller (not shown) in a conventional manner.

The processor platform 8000 also includes a conventional interface circuit 8030. The interface circuit 8030 may be implemented by any type of well-known interface standard, such as an external memory interface, serial port, general purpose input/output, etc.

One or more input devices 8035 and one or more output devices 8040 are connected to the interface circuit 8030. The input devices 8035 and output devices 8040 may be used, for example, to implement the example network interface 305 of FIG. 3, the example interface 405 of FIG. 4, etc.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A voice over Internet protocol apparatus comprising:
a call handler to enforce a parallel ring policy to limit a number of devices rung in response to a call based on parallel ring control information contained in a voice over Internet protocol call control message sent to a called telephone number associated with the call, the parallel ring control information including a parallel ring tree depth of a parallel ring tree associated with the call, the parallel ring tree depth being updateable during the call to indicate how many intervening telephone numbers along a path of the parallel ring tree have been called in response to an original called telephone number being called, the call handler to include an updated parallel ring tree depth in a second voice over Internet protocol call control message to be sent to a second telephone number during the call.

2. A voice over Internet protocol apparatus as defined in claim 1, further comprising a parallel ring policy enforcer to implement the parallel ring policy, wherein the call handler enforces the parallel ring policy by providing the parallel ring control information to the parallel ring policy enforcer and by receiving a response from the parallel ring policy enforcer.

3. A voice over Internet protocol apparatus as defined in claim 2, wherein the parallel ring policy enforcer is implemented by a voice over Internet protocol feature server.

4. A voice over Internet protocol apparatus as defined in claim 3, wherein the voice over Internet protocol feature server is a session initiation protocol based feature server.

5. A voice over Internet protocol apparatus as defined in claim 2, wherein the parallel ring policy enforcer is integrated in the call handler.

6. A voice over Internet protocol apparatus as defined in claim 2, wherein the parallel ring policy enforcer is separate from the call handler.

7. A voice over Internet protocol apparatus as defined in claim 1, further comprising a memory to store active parallel ring tree information, wherein a number of parallel rings that may be performed is determined based on the active parallel ring tree information and the parallel ring control information.

8. A voice over Internet protocol apparatus as defined in claim 7, wherein the active parallel ring tree information includes at least one of a parallel ring tree identifier, an origination time, a last call time, or a number of calls.

9. A voice over Internet protocol apparatus as defined in claim 7, further comprising a record maintainer to remove expired records from the active parallel ring tree information.

10. A voice over Internet protocol apparatus as defined in claim 1, further comprising at least one of a called device, a calling device, or a second call handler to provide the VoIP call control message.

11. A voice over Internet protocol apparatus as defined in claim 1, wherein the parallel ring control information further includes a call identifier.

12. A parallel ring policy enforcer comprising:
a memory to store parallel ring tree information; and
a policy checker to enforce a parallel ring policy based on a parallel ring request and the parallel ring tree information, the parallel ring request including a current parallel ring tree depth of a parallel ring tree associated with a called telephone number, the current parallel ring tree depth included in the parallel ring control information contained in a call control message sent to establish a call to the called telephone number and not available to the policy checker prior to the call control message being sent to the called telephone number, the current parallel ring tree depth being updateable to indicate how many intervening telephone numbers along a path of the parallel ring tree have been called in response to an original called telephone number being called, the policy checker to compare the current parallel ring tree depth to a threshold to enforce a parallel ring tree depth limit.

13. A parallel ring policy enforcer as defined in claim 12, further comprising an interface to receive the parallel ring request.

14. A parallel ring policy enforcer as defined in claim 12, further comprising a statistics processor to at least one of update the parallel ring tree information or compute parallel ring tree statistics.

15. A parallel ring policy enforcer as defined in claim 12, further comprising a record maintainer to delete old records from the parallel ring tree information.

16. A parallel ring policy enforcer as defined in claim 12, further comprising a configuration handler to receive a configuration message and to update configuration information in the memory device based on the configuration message, wherein the policy checker enforces the parallel ring policy based on the configuration information.

17. A parallel ring policy enforcer as defined in claim 16, wherein the configuration information is at least one of a maximum number of parallel rings, a maximum ring tree depth, a maximum ring tree size or a maximum number of children per ring tree parent.

18. A parallel ring policy enforcer as defined in claim 12, wherein the parallel ring request further includes a call identifier.

19. A parallel ring policy enforcer as defined in claim 12, wherein the parallel ring policy enforcer is a voice over Internet protocol feature server and receives the parallel ring request from a call handler.

20. A parallel ring policy enforcer as defined in claim 19, wherein the call handler is a voice over Internet protocol call processor.

21. A parallel ring policy enforcer as defined in claim 12, wherein the parallel ring policy enforcer is integrated in a voice over Internet protocol call processor.

22. A parallel ring policy enforcer as defined in claim 12, wherein the parallel ring policy further limits at least one of a parallel ring tree size, a number of child parallel ring calls, or a system-wide number of parallel ring calls.

23. A method comprising:
receiving a call control message having a header containing parallel ring control information including a parallel ring tree depth of a parallel ring tree associated with the call control message, the parallel ring tree comprising a root called telephone number and a first level associated with a first set of child telephone numbers configured to be rung when the root called telephone number is called, the parallel ring tree depth updateable to indicate that the parallel ring tree further comprises a second level associated with a second set of child telephone numbers when the second set of child telephone numbers is determined to be configured to be rung in response to a first child telephone number included in the first set of child telephone numbers being called; and
determining a number of allowed parallel rings based on (i) a comparison of a first threshold and a number of substantially simultaneous parallel rings requested to be performed in response to receiving the call control message, (ii) a comparison of a second threshold and the parallel ring tree depth, the parallel ring tree depth being updateable to indicate how many intervening telephone numbers along a path of the parallel ring tree have been called in response to the root called telephone number being called, and (iii) a comparison of a third threshold and a system-wide number of parallel rings occurring in a time period.

24. A method as defined in claim 23, further comprising:
determining a parallel ring request based on the parallel ring control information; and
providing the parallel ring request to a parallel ring policy enforcer.

25. A method as defined in claim 23, wherein the call control message is a voice over Internet protocol call control message structured in accordance with a session initiated protocol.

26. A method as defined in claim 23, further comprising providing a response indicating the number of allowed parallel rings.

27. A tangible article of manufacture storing machine readable instructions which, when executed, cause a machine to at least:
receive a call control message having a header containing parallel ring control information including a parallel ring tree depth of a parallel ring tree associated with the call control message, the parallel ring tree comprising a root called telephone number and a first level associated with a first set of child telephone numbers to be rung when the root called telephone number is called, the parallel ring tree depth updateable to indicate that the parallel ring tree further comprises a second level associated with a second set of child telephone numbers when the second set of child telephone numbers is to be rung in response to a first child telephone number included in the first set of child telephone numbers being called; and determine a number of allowed parallel rings by (i) comparing a first threshold to a number of substantially simultaneous parallel rings requested to be performed in response to receiving the call control message, (ii) comparing a second threshold to the parallel ring tree depth, the parallel ring tree depth being different from the requested number of substantially simultaneous parallel rings, and (iii) comparing a third threshold to a system-wide number of parallel rings occurring in a time period.

28. An article of manufacture as defined in claim 27, wherein the machine readable instructions, when executed, cause the machine to:

determining a parallel ring request based on the parallel ring control information; and providing the parallel ring request to a parallel ring policy enforcer.

29. An article of manufacture as defined in claim 27, wherein the call control message is a voice over Internet protocol call control message structured in accordance with a session initiated protocol.

30. An article of manufacture as defined in claim 27, wherein the machine readable instructions, when executed, cause the machine to provide a response indicating the number of allowed parallel rings.

\* \* \* \* \*